US012064964B2

(12) United States Patent
Wong et al.

(10) Patent No.: US 12,064,964 B2
(45) Date of Patent: Aug. 20, 2024

(54) INKJET HEAD

(71) Applicant: TOSHIBA TEC KABUSHIKI KAISHA, Tokyo (JP)

(72) Inventors: Meng Fei Wong, Mishima Shizuoka (JP); Ryutaro Kusunoki, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 292 days.

(21) Appl. No.: 17/541,743

(22) Filed: Dec. 3, 2021

(65) Prior Publication Data

US 2022/0402264 A1 Dec. 22, 2022

(30) Foreign Application Priority Data

Jun. 17, 2021 (JP) ................................ 2021-100695

(51) Int. Cl.
*B41J 2/045* (2006.01)

(52) U.S. Cl.
CPC ....... *B41J 2/04588* (2013.01); *B41J 2/04541* (2013.01); *B41J 2/04581* (2013.01); *B41J 2/04596* (2013.01)

(58) Field of Classification Search
CPC . B41J 2/04588; B41J 2/04581; B41J 2/04541
See application file for complete search history.

(56) References Cited

U.S. PATENT DOCUMENTS

| | | | | |
|---|---|---|---|---|
| 6,460,960 | B1 | 10/2002 | Mitsuhashi | |
| 10,226,922 | B2 | 3/2019 | Kusunoki et al. | |
| 11,390,074 | B2 | 7/2022 | Kusunoki et al. | |
| 2003/0179254 | A1 | 9/2003 | Okuda | |
| 2013/0271519 | A1* | 10/2013 | Kubo | B41J 2/04588 347/10 |
| 2019/0077146 | A1* | 3/2019 | Shimazoe | B41J 2/04588 |

FOREIGN PATENT DOCUMENTS

| | | | |
|---|---|---|---|
| EP | 3278989 | A1 | 2/2018 |
| EP | 3789201 | A1 | 3/2021 |
| JP | 2009286108 | A | 12/2009 |
| JP | 2020082433 | A | 6/2020 |

OTHER PUBLICATIONS

Extended European Search Report dated Jun. 29, 2022, mailed in counterpart European Application No. 22154906.6, 4 pages.

* cited by examiner

*Primary Examiner* — Lam S Nguyen
(74) *Attorney, Agent, or Firm* — Kim & Stewart LLP

(57) ABSTRACT

According to an embodiment, an inkjet head includes a nozzle that ejects ink, an ink pressure chamber that connects to the nozzle, an actuator that changes a volume of the ink pressure chamber, and an actuator driving circuit that drives the actuator with a driving waveform. The driving waveform includes an ejection pulse portion that changes from a first voltage to a second voltage at which the ink pressure chamber expands and then changes from the second voltage to a third voltage at which the ink pressure chamber contracts so as to eject the ink from the nozzle. The third voltage is between that of the first and second voltages in potential level. The potential difference between the second and third voltages is greater than the potential difference between the third and first voltages.

16 Claims, 10 Drawing Sheets

| | EXAMPLE | COMPARATIVE EXAMPLE 1 | COMPARATIVE EXAMPLE 2 |
|---|---|---|---|
| HEAD DROP SHAPE | ○ | × | ○ |
| RESIDUAL VIBRATION STABILIZATION | ○ | ○ | △ |
| DRIVING VOLTAGE AT SAME FLOW RATE | ○ 0.7＊V1 | △ V1 | ○ 0.6＊V1 |

INKJET HEAD

CROSS-REFERENCE TO RELATED APPLICATION

This application is based upon and claims the benefit of priority from Japanese Patent Application No. 2021-100695, filed Jun. 17, 2021, the entire contents of which are incorporated herein by reference.

FIELD

Embodiments described herein relate generally to an inkjet head.

BACKGROUND

Inkjet heads for ejecting ink are known inventions. In general, inkjet heads drive actuators, causing changes in volumes of ink pressure chambers in order to eject liquid droplets of ink from nozzles connected to the ink pressure chambers. Such inkjet heads are most typically mounted in inkjet printers, which eject liquid droplets of ink from the inkjet heads to form images on the surfaces of recording media.

Various driving waveforms to drive an actuator for ink ejection have been used. There is one driving waveform by which an ink pressure chamber is only partially contracted to eject a droplet rather than fully after the volume of the ink pressure chamber has been expanded. This type of driving waveform is also known as a draw-draw (DD) driving waveform. However, when ink is actually ejected with such a driving waveform, misting often occurs particularly at the beginning of ink droplet formation (that is, the initial portion of the ejected droplet is often generates ink mist). The misting of ink can be a cause of deteriorating printing quality.

Hence, there is a need for an inkjet head capable of suppressing such ink misting.

DETAILED DESCRIPTION

Figure 1:
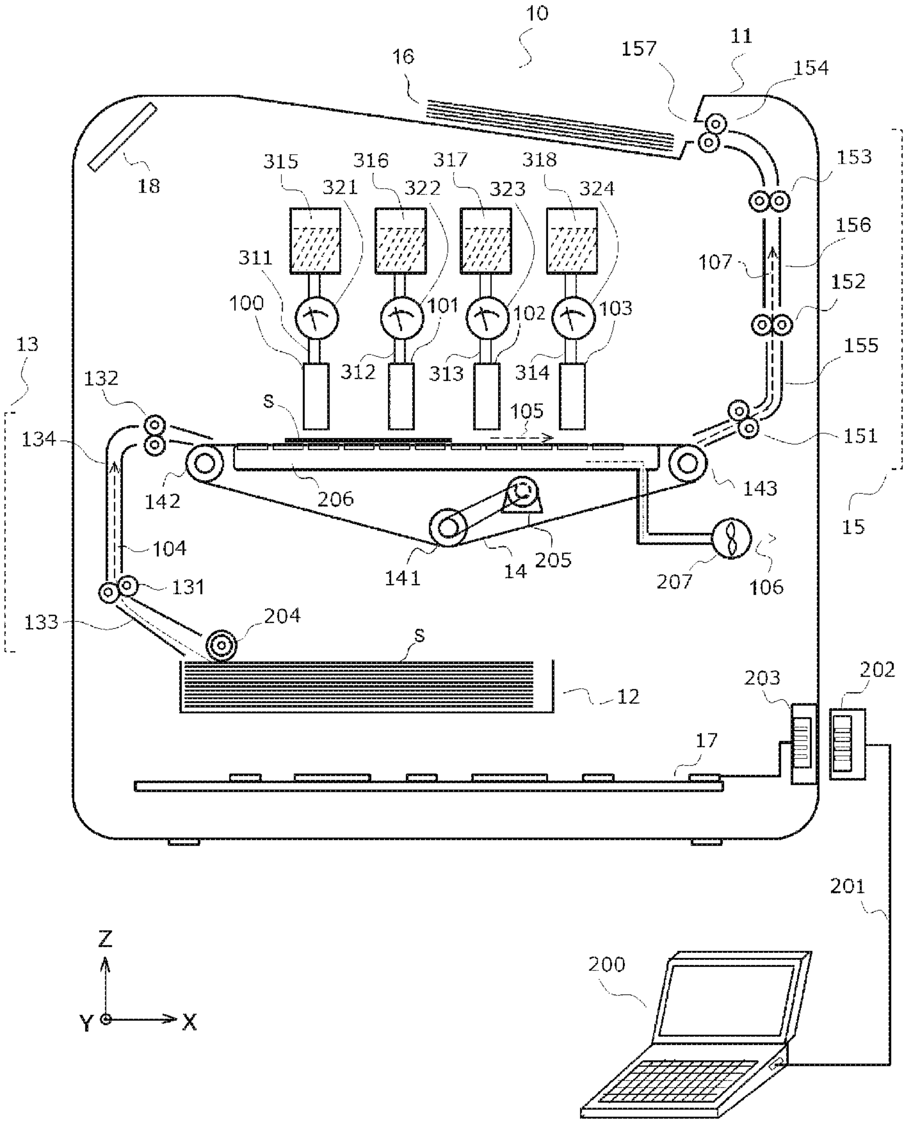
FIG. 1 is a diagram illustrating an inkjet printer according to a first embodiment.

According to an embodiment, an inkjet head includes a nozzle for ejecting ink or the like, an ink pressure chamber that is connected to the nozzle, an actuator that changes the volume of the ink pressure chamber, and an actuator driving circuit that applies a driving waveform to the actuator for ejecting ink. The driving waveform includes an ejection pulse portion that changes from a first voltage to a second voltage at which the ink pressure chamber expands and then from the second voltage to a third voltage at which the ink pressure chamber contracts. The third voltage is between the first and second voltages in potential. A potential difference between the second and third voltages is greater than a potential difference between the third and first voltages.

Hereinafter, certain example embodiments of an inkjet head and an inkjet printer will be described with reference to the accompanying drawings. In the drawings, the same reference numerals are given to the same configurations, components, elements, and the like.

First Embodiment

An inkjet printer 10 of the first embodiment includes inkjet heads 100, 101, 102, and 103 mounted therein. FIG. 1 illustrates a schematic configuration of the inkjet printer 10. The inkjet printer 10 includes a cassette 12 that accommodates a sheet of paper S which is an example of a recording medium, an upstream conveyance path 13 for the sheet S, a conveyance belt 14 that conveys the sheet S from the cassette 12, a plurality of inkjet heads (inkjet heads 100, 101, 102, and 103) that eject liquid drops of ink toward the sheet S on the conveyance belt 14, a downstream conveyance path 15 for the sheet S, a discharge tray 16, a control substrate 17, and a casing 11. The inkjet printer 10 further includes an operation unit 18 as a user interface provided on an upper side of the casing 11.

Image data to be printed on the sheet S is generated by, for example, a computer 200 which can be an external device communicably connected to the inkjet printer 10. The image data generated by the computer 200 is transmitted to the control substrate 17 (also referred to as a control board or the like) of the inkjet printer 10 through a cable 201 and connectors 202 and 203.

A pickup roller 204 supplies sheets S from the cassette to the upstream conveyance path 13 one by one. The upstream conveyance path 13 includes a pair of feeding rollers 131, a pair of feeding rollers 132, a sheet guide plates 133, and sheet guide plates 134. The sheet S is fed to the conveyance belt 14 via the upstream conveyance path 13. In FIG. 1, the arrow 104 indicates a conveyance path for the sheet S from the cassette 12 to the conveyance belt 14.

The conveyance belt 14 is, for example, a mesh belt having many through holes formed in its surface. A driving roller 141 and driven rollers 142 and 143 support the conveyance belt 14 so that the conveyance belt can rotate. A motor 205 rotates the conveyance belt 14 in a rotation direction 105 by rotating the driving roller 141. The motor 205 is an example of a driving device. The sheet S moves in conjunction with the rotation of the conveyance belt 14 past the ink jet heads 100 to 103 in turn. A negative pressure container 206 is on a rear surface side of the conveyance belt 14. The negative pressure container 206 is connected to a fan 207. The fan 207 reduces pressure inside the negative pressure container 206 by forming an air flow 106 and thus sucks and holds the sheet S to the upper surface of the conveyance belt 14.

The inkjet heads 100 to 103 are arranged to face the sheet S held on the conveyance belt 14 with small gaps of about 1 mm, for example, being left between sheet S surface and the inkjet heads 100 to 103 when the sheet S passes underneath each inkjet head in turn. The inkjet heads 100 to 103 eject ink droplets toward the sheet S. The inkjet heads 100 to 103 print an image when the sheet S passes under them. The respective inkjet heads 100 to 103 have the same structure as each other except that ink colors to be ejected are different. The ink colors are, for example, cyan, magenta, yellow, and black.

The inkjet heads 100 to 103 are respectively connected to ink tanks 315 to 318 and ink supply pressure adjustment devices 321 to 324 via ink flow passages 311 to 314. The ink tanks 315 to 318 are provided above the inkjet heads 100 to 103. At a device standby time, the ink supply pressure adjustment devices 321 to 324 respectively adjust the inside of the inkjet heads 100 to 103 to be a negative pressure, for example −1.2 kPa, with respect to the atmospheric pressure so that ink does not leak from nozzles 24 (see FIG. 2) of the inkjet heads 100 to 103. At an image formation time, the ink of the ink tanks 315 to 318 is supplied to the inkjet heads 100 to 103 by the ink supply pressure adjustment devices 321 to 324.

After the image is formed, the sheet S is sent from the conveyance belt 14 to the downstream conveyance path 15. The downstream conveyance path 15 is formed by pairs of feeding rollers 151, 152, 153 and 154 and sheet guide plates 155 and 156 that regulate a conveyance path of the sheet S. The sheet S is discharged from a discharge port 157 to the discharge tray 16 via the downstream conveyance path 15. In the drawing, arrow 107 indicates the conveyance path of the sheet S.

FIGS. 2 to 5 each illustrate aspects of the inkjet head 100. The inkjet heads 101, 102, and 103 have the same configuration as the inkjet head 100.

Figure 2:
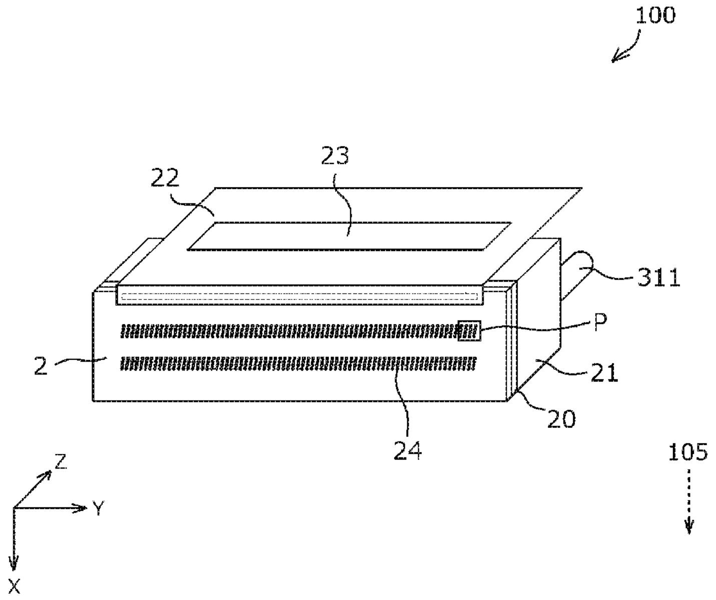
FIG. 2 depicts an inkjet head in a perspective view according to a first embodiment.

As shown in FIG. 2, the inkjet head 100 includes a nozzle plate 2, a substrate 20, an ink supply unit 21, a flexible substrate 22, and a driving circuit 23. A plurality of nozzles 24 configured to eject ink in a form of droplets are provided to the nozzle plate 2. The ink to be ejected from each nozzle 24 is supplied from the ink supply unit 21. The ink flow passage 311 from the ink supply pressure adjustment device 321 is connected to an upper side of the ink supply unit 21.

Figure 3:
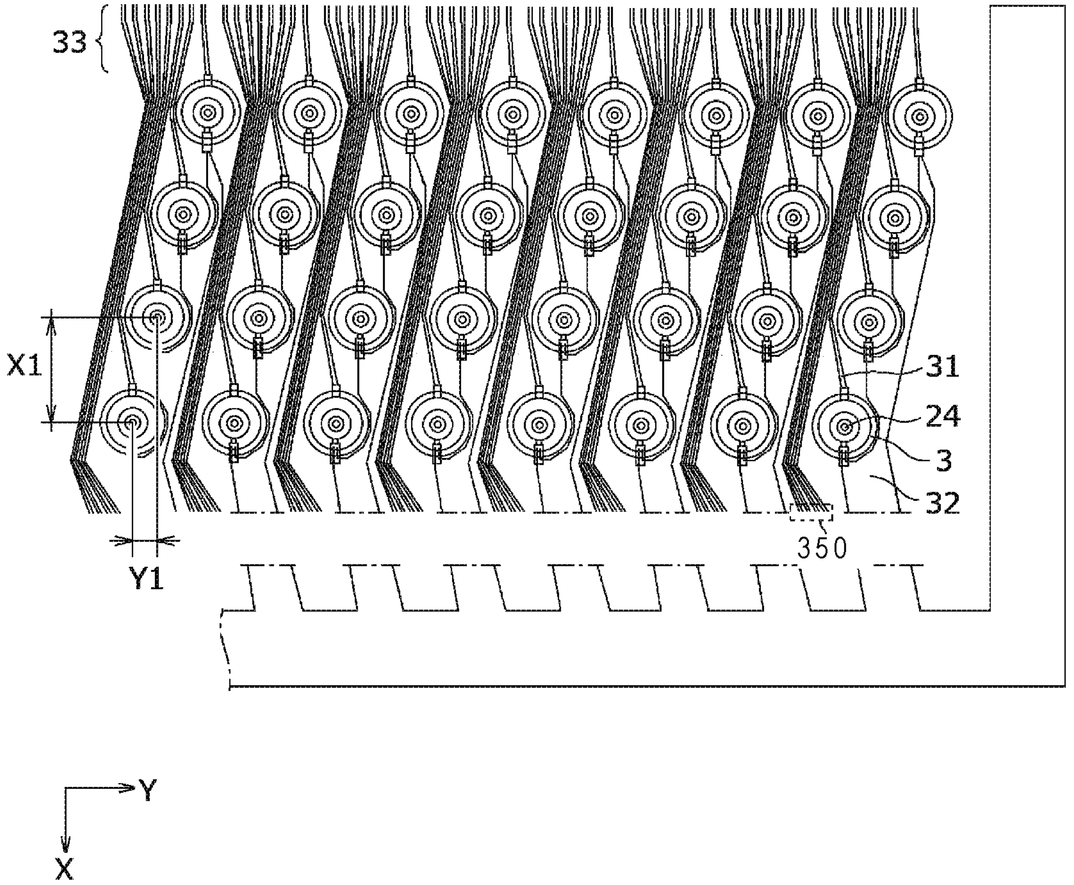
FIG. 3 depicts part of a nozzle plate of an inkjet head in an expanded plan view according to a first embodiment.

FIG. 3 illustrates an enlarged plan view of a portion surrounded by the frame P in FIG. 2, the nozzles 24 are arranged two-dimensionally in columns and rows (X and Y axis directions in the drawing). In each column (X direction), the nozzles 24 are arranged obliquely (in the plan view) such that the centers of the nozzles 24 do not overlap with one another on in X axis direction. The nozzles 24 are disposed at an interval of a distance X1 in the X axis direction and offset at a distance Y1 in the Y axis direction from the respective center lines. The distances X1 and YI are set to achieve a specific recording density or printing resolution. As an example, the distance X1 can be 338 μm and the distance Y1 can be 84.5 μm to achieve 300 dots-per-inch (DPI) in both X and Y axis directions. The distance X1 may be set based on a relation between a rotational speed of the conveyance belt and a time necessary for an ink droplet to land on a printing surface of the sheet S to achieve the intended resolution in the X axis direction.

In the present embodiment, four nozzles 24 are arranged in the X axis direction as one nozzle set, and a plurality of nozzle sets are provided next to each other along the Y axis direction. Although not separately illustrated, as an example, 75 sets of the nozzles 24 are arranged in the Y axis direction, and two groups, each consisting of the 75 nozzle sets, are arranged in the X axis direction (see FIG. 2), with the number of nozzles 24 totaling 600 (=4×75×2).

An actuator 3 which is a driving source in an ink ejection operation is provided with respect to each nozzle 24. A set of the nozzle 24 and actuator 3 forms one channel. Each actuator 3 has a ring shape and is arranged such that the nozzle 24 locates at a center of the actuator 3. The actuator 3 has a size of, for example, an inner diameter of 30 μm and an outer diameter of 140 μm. A plurality of individual electrodes 31 are also provided, and the actuators 3 are electrically connected to the corresponding individual electrodes 31, respectively. In the present embodiment, every four actuators 3 arranged in the X axis direction are electrically connected to a common electrode 32 arranged in the X axis direction. Both the individual electrode 31 and the common electrode 32 are electrically connected to a mounting pad 33. The mounting pad 33 serves as an input port that gives a driving waveform to each actuator 3. Of the plurality of individual electrodes 31, although not separately illustrated, four individual electrodes 31 surrounded by the frame 350 in the drawing are respectively connected to the actuators 3 of another group illustrated in FIG. 2. The same applies to the other individual electrodes 31 arranged in the X axis direction. As a modified example, the mounting pad 33 and the flexible substrate 22 may be added for the actuators 3 of the other group. Embodiments are not limited to the configuration in which the ink of the same color is ejected. For example, a flow passage of the ink may be separated from each group so that ink of another color is ejected. For ease of description, the actuators 3, the individual electrodes 31, and the common electrode 32 are illustrated with solid lines in FIG. 3 though some portions may be provided inside the nozzle plate 2 (see also FIG. 4 which illustrates a cross-sectional view of part of the inkjet head 100). The position of each of the actuators 3 is not limited to the present embodiment and can be modified as appropriate.

The mounting pad 33 is electrically connected to a wiring pattern formed in the flexible substrate 22 via, for example, an anisotropic contact film (ACF). The wiring pattern of the flexible substrate 22 is electrically connected to the driving circuit 23. The driving circuit 23 is, for example, an integrated circuit (IC). The driving circuit 23 selects a channel from which the ink is ejected in accordance with the image data to be printed and applies the driving waveform to the actuators 3 of the selected channel.

Figure 4:
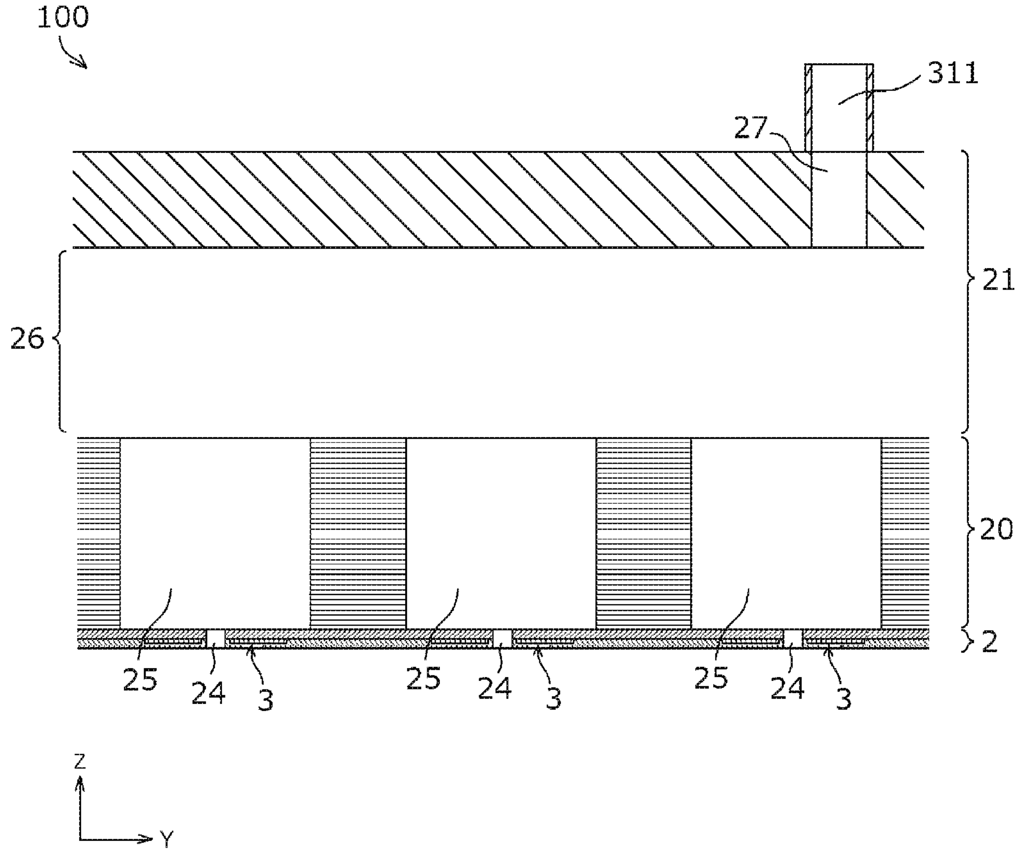
FIG. 4 depicts part of an inkjet head in a cross-sectional view according to a first embodiment.

As illustrated in FIG. 4, the nozzles 24 penetrate the nozzle plate 2 in the Z axis direction. Each nozzle 24 has a diameter of, for example, 20 μm. Inside the substrate 20, an ink pressure chamber 25 that communicates with the corresponding nozzle 24 is provided. The ink pressure chambers 25 may be referred to as individual pressure chambers in some contexts. The ink pressure chamber 25 is, for example, a cylindrical space having an upper end portion that is open. The open upper portion of each ink pressure chamber 25 connects with a common ink chamber 26. The ink flow passage 311 communicates with the common ink chamber 26 via an ink supply port 27. The ink pressure chamber 25 and the common ink chamber 26 are filled with the ink. The common ink chamber 26 has, for example, a flow passage shape in which the ink is circulated. The ink pressure chamber 25 has, for example, a configuration in which a cylindrical hole with a diameter of, for example, 200 μm is formed in the substrate 20 of a monocrystalline silicon wafer with a thickness of, for example, 400 μm. The ink supply unit 21 has a configuration in which a space corresponding to the common ink chamber 26 is formed, for example, in alumina ($Al_2O_3$).

Figure 5:
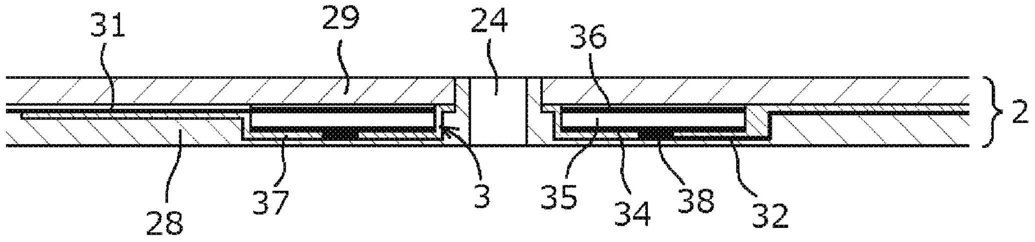
FIG. 5 depicts part of a nozzle plate of an inkjet head according to a first embodiment.

As shown in FIG. 5, the nozzle plate 2 has a structure in which a protective layer 28, the actuator 3, and a vibration plate 29 are stacked on one another in order from a bottom surface side of the nozzle plate 2. The actuator 3 has a structure in which an upper electrode 34, a piezoelectric body 35, and a lower electrode 36 are stacked on one another. The piezoelectric body 35 has a thin sheet shape. The lower electrode 36 is electrically connected to the individual electrode 31, and the upper electrode 34 is electrically connected to the common electrode 32. In a boundary area of the protective layer 28 and the vibration plate 29, an insulation layer 37 that prevents short-circuiting between the individual electrodes 31 and the common electrode 32 is provided, being sandwiched between the protective layer 28 and the vibration plate 29. The insulation layer 37 is formed of a silicon dioxide film ($SiO_2$) with a thickness of, for example, 0.5 μm. The upper electrode 34 and the common electrode 32 are electrically connected by a contact hole 38 formed in the insulation layer 37. The piezoelectric body 35 is formed of PZT (lead zirconate titanate) with a thickness of, for example, 5 μm or less. The lower electrode 36 and the upper electrode 34 are formed of platinum with a thickness of, for example, 0.1 μm. The individual electrodes 31 and the common electrode 32 are formed of gold (Au) with a thickness of, for example, 0.3 μm.

The vibration plate 29 is formed of an insulating inorganic material. The insulating inorganic material is, for example, silicon dioxide ($SiO_2$). The thickness of the vibration plate 29 is in the range of, for example, 2 μm to 10 μm or may be in the range of, for example, 4 μm to 6 μm. The vibration plate 29 and the protective layer 28 are configured to bend or flex in Z direction towards the ink pressure chamber 25 when the piezoelectric body 35 deforms in a d31 mode upon voltage application. If the application of the voltage to the piezoelectric body 35 is stopped, the vibration plate 29 and the protective layer 28 return to the original shape (relax). This reversible deformation process enables the volume of the ink pressure chamber 25 to be expanded and contracted. When the volume of the ink pressure chamber 25 changes, the ink pressure inside the ink pressure chamber 25 will also change. The ink is ejected from the nozzles 24 using both the expansion and contraction of the volume of the ink pressure chamber 25 and the resulting change in the ink pressure.

In the present embodiment, the nozzle 24, the actuator 3, and the ink pressure chamber 25 form or function as an ink ejection unit of the inkjet head 100.

The protective layer 28 is formed of polyimide with a thickness of, for example, 4 μm. The protective layer 28 covers one surface of the bottom surface side of the nozzle plate 2 facing the sheet S and also covers an inner circumferential surface of a hole of the nozzle 24.

Figure 6:
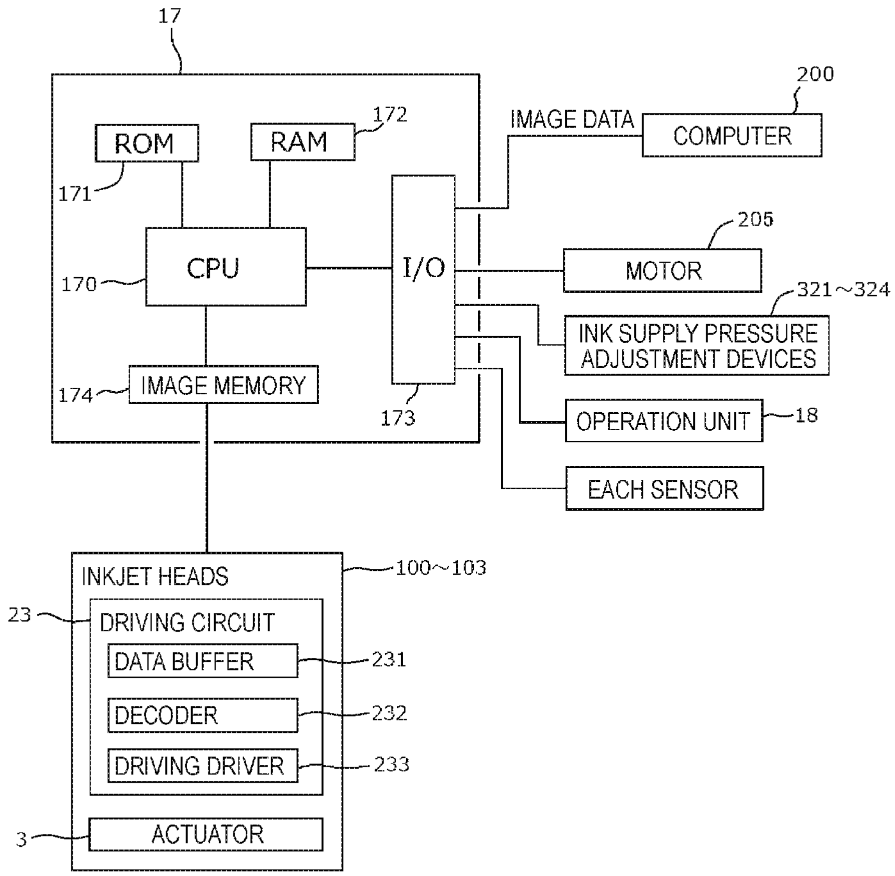
FIG. 6 is a block diagram illustrating aspects related to a control system of an inkjet printer according to a first embodiment.

As shown in FIG. 6, the control substrate 17 that serves as a control unit of the inkjet printer 10 includes a central processing unit (CPU) 170, a read-only memory (ROM) 171, a random-access memory (RAM) 172, an input and output (I/O) port 173, and an image memory 174 mounted thereon. The CPU 170 controls the motor 205, the ink supply pressure adjustment devices 321 to 324, the operation unit 18, and various sensors through the I/O port 173. The image data from the computer 200 is transmitted to the control substrate 17 through the I/O port 173 and stored in the image memory 174. The CPU 170 transmits the image data stored in the image memory 174 to the driving circuits 23 of the respective inkjet heads 100 to 103 in order of forming the image on the sheet S. The transmitted data may include gradation data for designating gradations of dots based on the image data.

The driving circuit 23 includes a data buffer 231, a decoder 232, and a driver 233. The data buffer 231 chronologically stores therein the image data for each actuator 3. The decoder 232 controls the driver 233 based on the image data stored in the data buffer 231 for each actuator 3. The driver 233 outputs a driving signal for operating each actuator 3 under the control of the decoder 232. The driving signal is a voltage applied to the actuator 3 in accordance with a driving waveform.

That is, the driving circuit 23 for each of the inkjet heads 100 to 103 functions as an actuator driving circuit that provides the driving waveform to each actuator 3.

Figure 7:
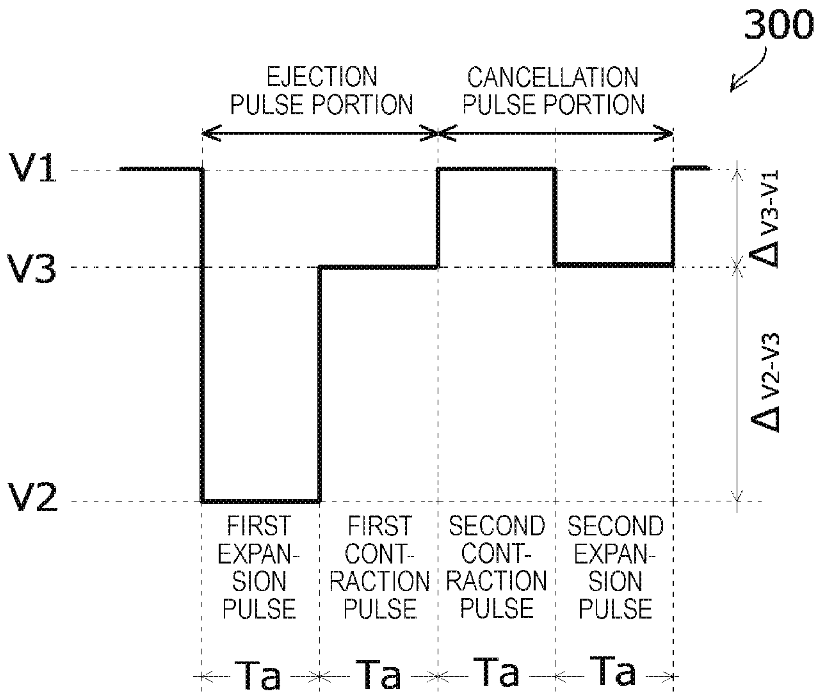
FIG. 7 is a diagram illustrating a driving waveform of an actuator of an inkjet head according to a first embodiment.

FIG. 7 illustrates a driving waveform 300 to drive the actuator 3 such that ink will be ejected. The driving waveform 300 is an example of a so-called pull-striking driving waveform. If a dot is to be formed by ejecting ink once, the actuator 3 can be driven with the driving waveform 300. If gradation printing is to be performed to form a dot with two or more ejections, the actuator 3 would be driven with a multi-drop driving waveform instead of the driving waveform 300.

In the driving waveform 300, if voltages V1 and V3 are positive voltages (where V1>V3) and a voltage V2 is set to 0 V, as illustrated in FIG. 7, the voltage V1, as an example of a first voltage, is applied to the actuator 3 as a bias voltage. For example, the voltage V1 is applied to the lower electrode 36 of the actuator 3 through the individual electrode 31. The common electrode 32 connected to the upper electrode 34 of the actuator 3 is set to 0 V. As a first expansion pulse for further expanding the ink pressure chamber 25 from the state or volume thereof at the voltage V1, the voltage V2 is applied to the actuator 3 through the individual electrode 31 at a start time for a time Ta. Thereafter, as a first contraction pulse for contracting the ink pressure chamber 25 from the expanded state, the voltage V3 is applied to the actuator 3 through the individual electrode 31 after the first time Ta for another time Ta. The first contraction pulse is a contraction pulse for ejecting ink. Subsequently, as a second contraction pulse for further contracting the ink pressure chamber 25, the voltage V1 is applied to the actuator 3 through the individual electrode 31. The second contraction pulse is a contraction pulse for attenuating residual vibration (oscillation).

In the driving waveform 300, the first extraction pulse and the first contraction pulse together form an "ejection pulse portion" for ejecting ink. That is, the ejection pulse portion of this example includes a draw-draw (DD) driving waveform for ejecting an ink droplet by initially expanding the ink pressure chamber 25 and then contracting the ink pressure chamber 25, but only partially (for example, midway).

After the application of the voltage V1 of the second contraction pulse, the voltage V3 is applied to the actuator 3 through the individual electrode 31 for a time Ta as a second expansion pulse for expanding the ink pressure chamber 25. Thereafter, the voltage V1 is again applied to the actuator 3 through the individual electrode 31. The voltage V1 can be applied as the bias voltage until a subsequent first expansion pulse starts (that is, when another ejection event begins). The actuator 3 can be driven with the same driving waveform 300 during a driving period after the initial ejection.

In the driving waveform 300, the second contraction pulse and the second expansion pulse together form a "cancellation pulse portion" for attenuating residual vibration after the first contraction pulse of the ejection pulse portion. In this way, in the driving waveform 300, the ejection pulse portion and the cancellation pulse portion may be combined to form a draw-draw-release-draw (DDRD) driving waveform.

In the present embodiment, the relation of magnitude among the voltages V1 to V3 satisfies V1>V3>V2. In the driving waveform 300, the potential difference Δ(V2−V3) between the voltages V2 and V3 in the ejection pulse portion is greater than the potential difference Δ(V3−V1) between the voltages V3 and V1 in the same ejection pulse portion, that is Δ(V2−V3)>Δ(V3−V1). In some instances, the ratio of Δ(V2−V3) to Δ(V3−V1) is preferably within a range of 6:4 to 8:2. In some instances, the ratio of Δ(V2−V3) to Δ(V3−V1) is more preferably set to 7:3 when Δ(V1−V2) is set to 1, such that Δ(V2−V3):Δ(V3−V1)=0.7:0.3. As an example, the voltages V1 to V3 can be set as follows: V1=24 V; V3=16.8 V; and V2=0 V. The voltage of the common electrode 32 can be set to be constant at 0 V. Thus, the ratio of Δ(V2−V3) to Δ(V3−V1) is 7:3, when Δ(V2−V3)=16.8 V and Δ(V3−V1)=7.2 V.

Each pulse width (that is, the time Ta) may be set to a half period (λ/2) of a first natural vibration period λ of the actuator 3 in a state in which the ink pressure chamber and the nozzle 24 are filled with ink. The natural vibration period λ can be measured, for example, by detecting a change in impedance of the actuator 3 while the ink pressure chamber 25 and the nozzle 24 are ink-filled. The impedance can be detected using, for example, an impedance analyzer. As another method of measuring the natural vibration period λ, an electrical signal with a stepped waveform can be input from the driving circuit 23 to the actuator 3 and vibration of the actuator 3 may be measured with a laser Doppler vibrometer or the like. The vibration amounts may be obtained through computer simulation. As a modified example, Ta for each pulse may be a multiple of λ/2 or may be shorter than λ/2. Furthermore, in some examples, the time Ta (pulse width) for each of the respective pulses may be different from each other. The value λ/2 is also sometimes referred to as an acoustic length (AL).

While in the example of FIG. 7, V1 and V3 are set to positive voltages (where V1>V3) and V2 is set to 0 V, embodiments or examples of the disclosure are not limited thereto. As a modified example, V1 and V3 may be set to positive voltages and V2 may be set to a negative voltage. The negative voltage of V2 may be equal to or greater than a polarization reversal voltage of the piezoelectric body 35. For example, V1, V3, and V2 may be 17 V, 9.8 V, and −7 V, respectively.

Figure 8A:
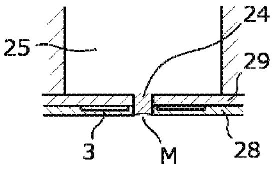
FIGS. 8A to 8G are diagrams schematically illustrating ink ejection operations of an actuator according to a first embodiment.
Figure 8B:
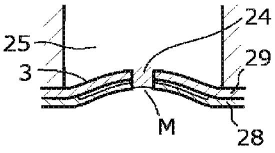
Figure 8C:
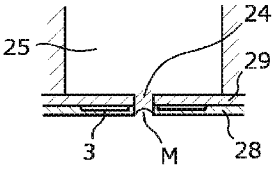

FIGS. 8A to 8G schematically illustrate the ink ejection operations when the actuator 3 is driven with the driving waveform 300 of FIG. 7. The reference numeral "M" in the figures denotes the meniscus (meniscus M) of ink. When the bias voltage V1 is applied to the actuator 3 in its standby state (see FIG. 8A), an electrical field in the thickness direction of the piezoelectric body 35 will be generated and the piezoelectric body 35 will deform in the d31 mode (see FIG. 8B). Specifically, in the case of a ring-shaped piezoelectric body 35, the piezoelectric body 35 expands in the thickness direction and contracts in the radial direction. Due to the deformation of the piezoelectric body 35, bending stress will be generated in the vibration plate 29, and the actuator 3 will curve inward or warp towards the ink pressure chamber 25 as illustrated in FIG. 8B. That is, the actuator 3 deforms to a concave shape centered at the nozzle 24, and the volume of the ink pressure chamber 25 is reduced (contracts).

Subsequently, when the voltage V2 of the first expansion pulse is applied, the actuator 3 returns to its state (see FIG. 8C) before the deformation. At this time, as the ink pressure chamber returns to the original state and its volume expands from the previously contracted state, the ink pressure inside the ink pressure chamber 25 decreases. As the ink starts to flow into the pressure-decreased ink pressure chamber 25 from the common ink chamber 26, the ink pressure increases again. Thereafter, the supply of the ink to the ink pressure chamber 25 stops, and the increase in the ink pressure also stops. With this operation, a so-called pull state is achieved.

Figure 8D:
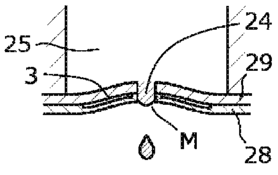

Subsequently, when the voltage V3 of the first contraction pulse is applied, the piezoelectric body 35 of the actuator 3 will further deform and the volume of the ink pressure chamber 25 will contract again as illustrated in FIG. 8D. This causes the ink pressure inside the ink pressure chamber 25 to increase. Thus, the ink is ejected from the nozzle 24 due to the contraction of the volume of the ink pressure chamber 25 in conjunction with the increase of the ink pressure inside the pressure chamber 25.

Figure 8E:
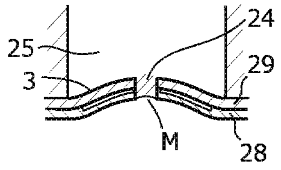

After the ejection pulse portion of the driving waveform 300, when the voltage V1 of the second contraction pulse in the cancellation pulse portion is applied, the volume of the ink pressure chamber 25 will further contract as illustrated in FIG. 8E. The ejection of the ink reduces the ink pressure inside the ink pressure chamber 25 whereas the residual vibration of the ink remains present in the ink pressure chamber 25. The further contraction of the volume of the ink pressure chamber 25 by the application of the voltage V1 attenuates the residual vibration of the ink.

Figure 8F:
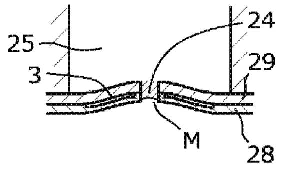
Figure 8G:
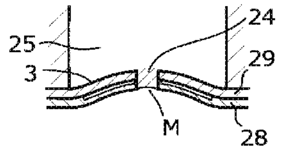

When the voltage V3 of the second expansion pulse is applied (see FIG. 8F), the deformation amount of the piezoelectric body 35 of the actuator 3 will be less than that when the voltage V1 is applied (see in FIG. 8E) while the ink pressure chamber 25 remains in a partially expanded state (as illustrated in FIG. 8F). This cancellation pulse portion attenuates the residual vibration.

Subsequent to this cancellation pulse portion, when the voltage V1 is again applied (FIG. 8G), the volume of the ink pressure chamber 25 will contract again and the same state as depicted in FIG. 8B is achieved again.

Figure 9:
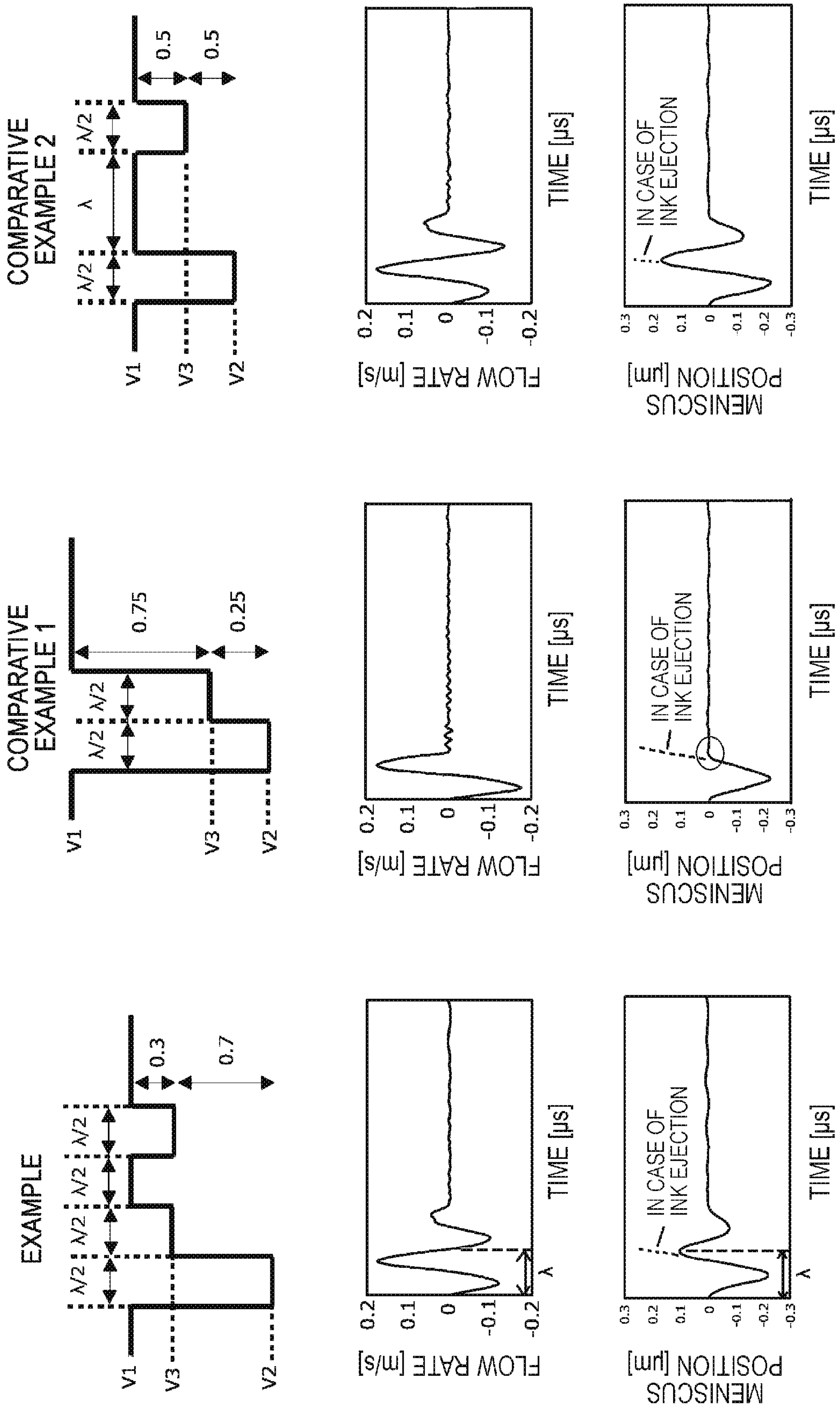
FIG. 9 is a diagram illustrating aspects related to experimental results when an actuator is operated with certain driving waveforms.

Experiments of the ink ejection operation using the driving waveform 300, a DD driving waveform, and another driving waveform were conducted, and their results are shown in FIG. 9 as Example, Comparative Example 1, and Comparative Example 2, respectively. For each experiment, a driving waveform used in the experiment, a change in a flow velocity of the ink in the ink ejection operation, and a change in a position of a meniscus M of the ink are illustrated. The flow velocity of the ink is indicated by a negative value for a direction of inflow to the ink pressure chamber 25 and a positive value for a direction of outflow from the ink pressure chamber 25. For the position of the meniscus, a change towards the ejection direction is indicated as a positive value and a change in the inward direction is indicated as a negative value, using the position of the meniscus M in an initial state (see FIG. 8A) as a reference.

Figure 10:
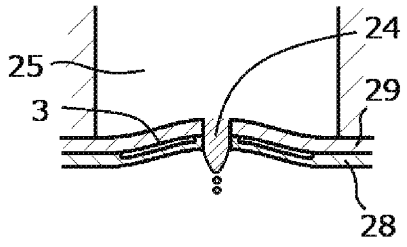
FIG. 10 is a diagram schematically illustrating ink misting.

In the DD driving waveform of Comparative Example 1, the potential difference Δ(V2−V3) between the voltages V2 and V3 is less than the potential difference Δ(V3−V1) between the voltages V3 and V1. If the potential difference Δ(V1−V2) between the voltages V1 and V2 is set to 1 then Δ(V2−V3):Δ(V3−V1)=0.25:0.75. With such a DD driving waveform, ink at the beginning of a droplet formation can be misted at the time of ink ejection as shown in FIG. 10. Taking into consideration the change in the position of the meniscus M as illustrated in FIG. 9, the possible reason why the ink at the beginning of droplet formation is misted using the DD driving waveform of Comparative Example 1 may be that the meniscus M, which normally protrudes from a nozzle surface due to pressure vibration, is not formed upon the ejection of the ink droplet (see the portion surrounded by a circle in the meniscus position drawing of Comparative Example 1 in FIG. 9).

Figure 11:
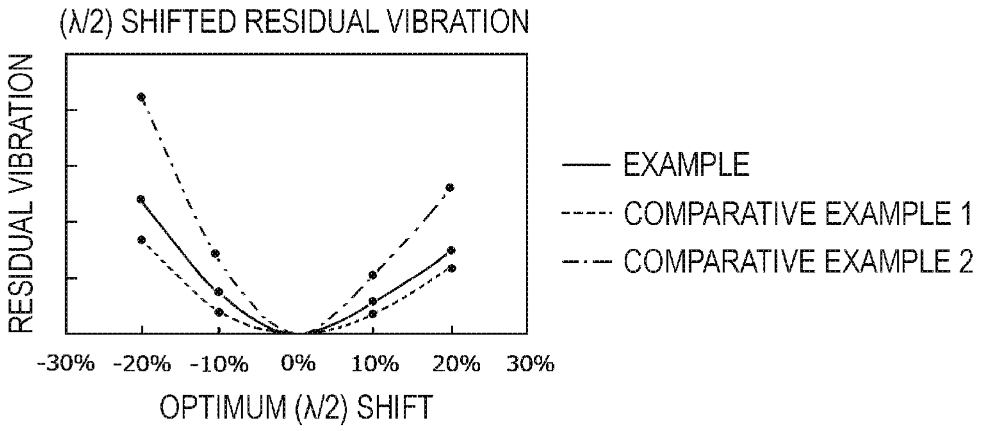
FIG. 11 illustrates results of certain ink ejection experiments.

On the other hand, if, as in Comparative Example 2, a DD driving waveform is not used, the misting at the beginning of droplet formation is unlikely to occur. However, if the DD driving waveform is not used, any shift in a half period (λ/2) of the natural vibration period λ of the inkjet head 100 from an optimum value of λ/2 may cause larger residual vibration after the ink ejection. A magnitude of the residual vibration according to the shift from the optimum λ/2 value is shown in FIG. 11. As shown in FIG. 11, if a DD driving waveform is not used (Comparative Example 2), the residual vibration increases substantially according to the shift from the optimum λ/2. Once the residual vibration increases beyond a non-negligible extent, it will likely affect a subsequent ejection state of the ink or cause crosstalk with another channel.

Normally, for a driving waveform, the optimum λ/2 is calculated based on the structure, size, and the like for the inkjet head and this is used at the pulse width value (that is, time Ta). For example, the optimum λ/2 can be about 2.5 μs. However, due to limits in manufacturing precision (manufacturing tolerances) for inkjet heads, the half period (λ/2) of the actual natural vibration period λ can be shifted away from the calculated optimum λ/2 value in some cases. For example, the inkjet head printer 10 of FIG. 1 includes the plurality of inkjet heads 100 to 103 each having nominally the same shape and the same size, but the natural vibration periods λ of the respective inkjet heads 100 to 103 may not necessarily be the same as one another for a variety of reasons.

On the other hand, when the driving waveform 300 is used according to the present embodiment, ink misting was prevented by setting the potential difference Δ(V2−V3) for the voltages V2 and V3 in the ejection pulse portion to be greater than the potential difference Δ(V3−V1) for the voltages V3 and V1. If the potential difference Δ(V1−V2) is set to 1 then Δ(V2−V3):Δ(V3−V1)=0.75:0.25. Taking into consideration the change in the position of the meniscus M as illustrated in FIG. 9, the possible reason why the ink misting can be prevented may be that the meniscus M, which normally protrudes from a nozzle surface due to pressure vibration, is formed when the ink droplet is ejected.

In this way, the driving waveform 300 can effectively prevent ink misting by setting Δ(V2−V3) in the ejection pulse portion to be greater than Δ(V3−V1). However, since the potential difference Δ(V3−V1) of the driving waveform 300 is less than that of the driving wave form of Comparative Example 1 and Comparative Example 2, the residual vibration attenuation of the second contraction pulse alone becomes less effective. Therefore, the driving waveform 300 is set to form the DDRD driving waveform by the combination of the ejection pulse portion and the cancelation pulse portion according to the present embodiment so that the residual vibration is effectively attenuated.

Further, as illustrated in FIG. 11, for the driving waveform 300 ("EXAMPLE"), the residual vibration does not become as large as that in Comparative Example 2 even when the half period (λ/2) of the natural vibration period λ shifts from the calculated optimum λ/2. As summarized in the comparative table shown in FIG. 11, the driving waveform 300 has well-balanced advantages of both prevention of the ink misting and stabilization of the residual vibration. By setting the ratio of Δ(V2−V3) to Δ(V3−V1) to 7:3 (that is, if Δ(V1−V2) is set to 1 then Δ(V2−V3):Δ(V3−V1)=0.7:0.3), a minimum number of voltages V1, V2 and V3 is necessary to form the DDRD driving waveform. Further, such ratio setting can be regarded as having selected the optimum point at which the well-balanced effects of the ink misting prevention and the residual vibration stabilization are achieved.

In the example of FIG. 7, by forming the driving waveform 300 with just the three voltages V1, V2 and V3 necessary for the DDRD driving waveform, a circuit configuration can be made simpler. The number of voltages for the DDRD driving waveform is not, however, limited to the present embodiment. The driving waveform 300 may be formed with four or more different voltages. As an example, a fourth voltage can be set to be lower than the voltage V1 or higher than the voltage V1. As another example, a fifth voltage can be set to be lower than the voltage V3 or higher than the voltage V3.

Second Embodiment

The inkjet heads 100 to 103 according to a second embodiment utilizes a multi-drop driving waveform with which gradation printing can be performed. The configurations of the inkjet heads 100 to 103 of the second embodiment are the same or substantially the same as those of the first embodiment except for the generation and application of the driving waveform.

Figure 12:
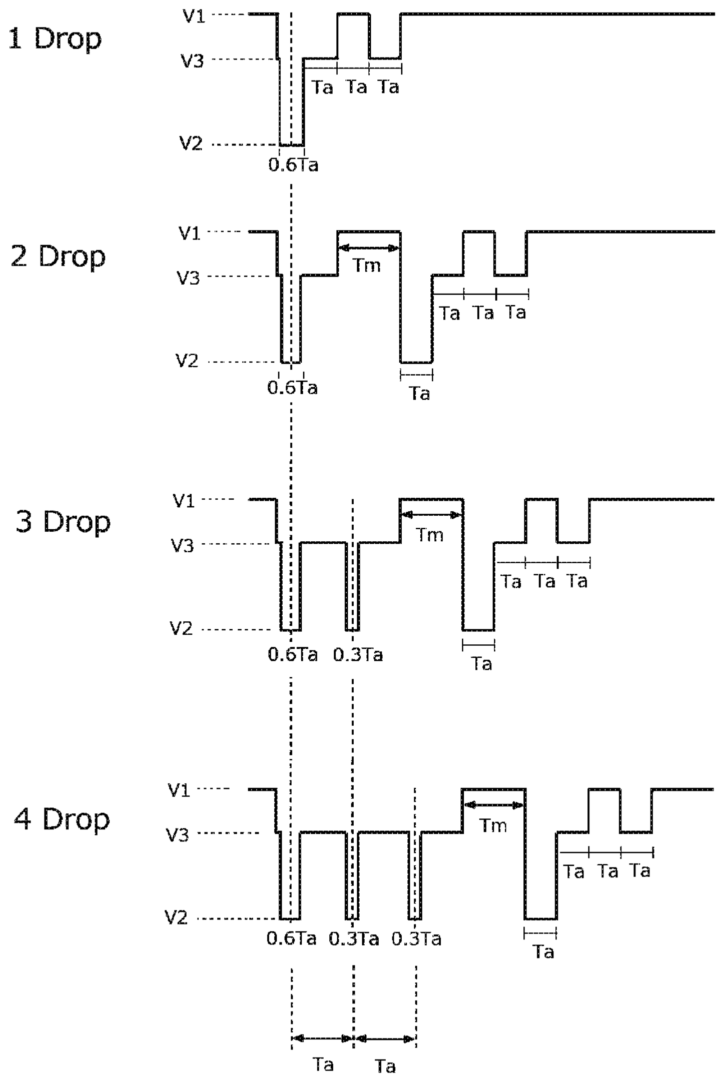
FIG. 12 illustrates multi-drop driving waveforms for an actuator of an inkjet head according to a second embodiment.

FIG. 12 illustrates multi-drop driving waveforms of "2 Drop," "3 Drop," and "4 Drop." A "1 Drop" driving waveform is also depicted. The 2 Drop driving waveform is for printing two gradations by ejecting ink twice and includes a first-drop ejection pulse and a second-drop ejection pulse. For the multi-drop driving waveforms, the voltage V1 serving as a bias voltage is initially applied to the actuator 3. From that state, as an expansion pulse (or a first-drop expansion pulse), the voltage V2 is applied to the actuator 3 for the time duration of 0.6 Ta. As a contraction pulse (or a first-drop contraction pulse), the voltage V3 is then applied to the actuator 3 for the time duration of Ta to eject a first-drop ink. That is, the first-drop ejection pulse is the same as the ejection pulse portion in the driving waveform 300 of the first embodiment (see FIG. 7) except that the application time of the voltage V3 is adjusted as appropriate for the 2 Drop case. Subsequently, as a further contraction pulse (or a first-drop further contraction pulse), the voltage V1 is applied to the actuator 3 to attenuate residual vibration.

The second-drop ejection pulse including a second-drop expansion pulse and a second-drop contraction pulse is the same as the ejection pulse portion of the driving waveform 300. The cancellation pulse following the second-drop ejection pulse is also the same as the cancellation pulse portion of the driving waveform 300. In both the first and second drop ejection pulses of the 2 Drop driving waveform, the potential difference Δ(V2−V3) between the voltages V2 and V3 in the contraction pulse at which the ink is ejected is greater than the potential difference Δ(V3−V1) between the voltages V3 and V1, that is Δ(V2−V3)>Δ(V3−V1).

An intermediate time period Tm is provided between the first and second drops, that is between the first and second drop ejection pulses. The intermediate time period Tm is, for example, 2 Ta. An ejection speed of the second-drop ink is increased by setting the pulse width of the first-drop expansion pulse of the first-drop ejection pulse to 0.6 Ta and setting the pulse width of the second-drop expansion pulse of the second-drop ejection pulse to Ta. If Ta is set to λ/2, the pulse width of the first-drop expansion pulse is 0.6(λ/2), the pulse width of the second-drop expansion pulse is λ/2, and the intermediate time period Tm is λ. If the ejection speed of final-drop ink that is the second-second-drop ink in the case of the 2-Drop driving wave is increased and the intermediate time period Tm is provided, satellites of ink can be prevented from occurring.

The 3 Drop driving waveform is for printing three or more gradations by ejecting ink three times and includes a first-drop ejection pulse, a second-drop ejection pulse, and a third-drop ejection pulse. In the multi-drop driving waveform (3 Drop), the voltage V1 serving as a bias voltage is initially applied to the actuator 3. From that state, as a first-drop expansion pulse, the voltage V2 is applied to the actuator 3 for the time duration of 0.6 Ta. As a first-drop contraction pulse, the voltage V3 is applied to the actuator 3 to eject first-drop ink. That is, the first-drop ejection pulse is the same as the ejection pulse portion of the driving waveform 300 of the first embodiment (see FIG. 7) except that the application time of the voltage V3 has been adjusted as appropriate for the 3 Drop case.

Subsequently, as a second-drop expansion pulse, the voltage V2 is applied to the actuator 3 for the time duration of 0.3 Ta. As a second-drop contraction pulse, the voltage V3 is applied to the actuator 3 to eject second-drop ink. Further, as a second-drop further contraction pulse, the voltage V1 is applied to the actuator 3 to attenuate residual vibration.

The third-drop ejection pulse is the same as the ejection pulse portion of the driving waveform 300. The cancellation pulse following the third-drop ejection pulse is also the same as the cancellation pulse portion of the driving waveform 300. In the 3 Drop driving waveform, the potential difference Δ(V2−V3) between the voltages V2 and V3 in the contraction pulse at which ink is ejected is greater than the potential difference Δ(V3−V1) between the voltages V3 and V1, that is Δ(V2−V3)>Δ(V3−V1) for all of the first to third drops.

An intermediate time period Tm is provided between the second and third drops, that is between the second and third drop ejection pulses. The intermediate time period Tm is, for example, 2 Ta. An ejection speed of the third-drop ink which is a final drop is increased by setting the pulse width of the first-drop expansion pulse of the first drop ejection pulse to 0.6 Ta, setting the pulse width of the second-drop expansion pulse of the second drop ejection pulse to 0.3 Ta, and setting the pulse width of the third-drop expansion pulse of the third drop ejection pulse to Ta. If Ta is set to λ/2, the pulse width of the first-drop expansion pulse is 0.6(λ/2), the pulse width of the second-drop expansion pulse is 0.3(λ/2), the pulse width of the third-drop expansion pulse is λ/2, and the intermediate time period Tm is λ. If the ejection speed of the final-drop ink is increased and the intermediate time period Tm is provided, satellites of ink can be prevented from occurring. The interval between the first-drop expansion pulse and the second-drop expansion pulse is set such that the time duration between a center time of the first-drop expansion pulse and a center time of the second-drop expansion pulse (see the vertical dotted lines of the respective pulses in FIG. 12) is equal to Ta.

The 4 Drop driving waveform has the same configuration as the 3 Drop driving waveform except that it includes a fourth-drop ejection pulse following the third-drop ejection pulse. Although not separately illustrated, a multi-drop driving waveform by which ink is ejected 5 or more times can be similarly configured.

If the depicted driving waveforms illustrated in FIG. 12 are used, the width of the expansion pulse can be set to 0.6 Ta in the driving waveform portion by which ink is ejected so that the ejection state of the ink is maintained.

Modified Embodiments

Figure 13:
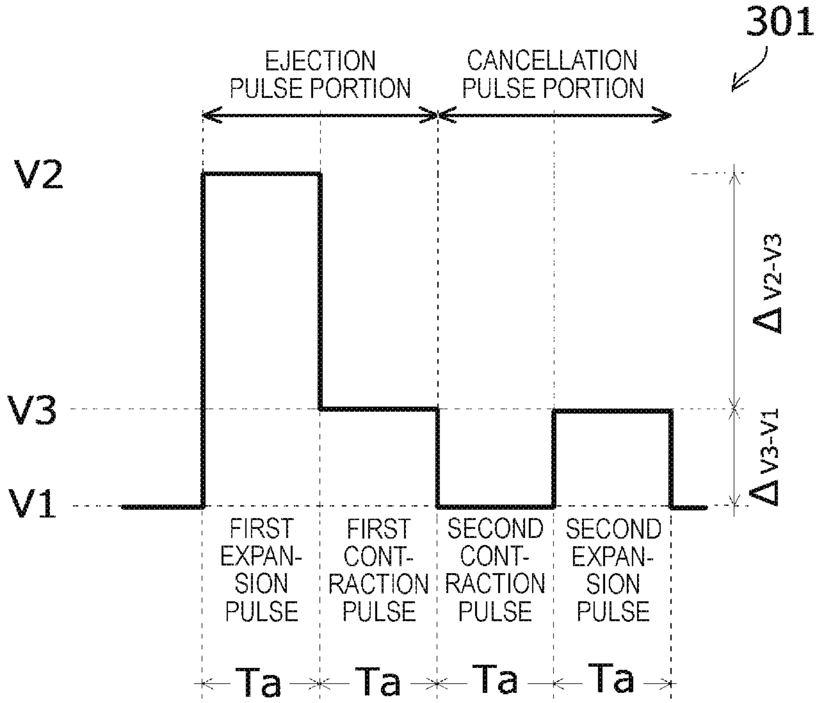
FIG. 13 is a diagram illustrating a driving waveform of an actuator of an inkjet head according to a modified example.

In the configurations according to the first and second embodiments, the driving signal (waveform) is applied to the lower electrode 36 of the actuator 3 through the individual electrode 31 (see FIG. 5). That is, the voltage application direction matches with the polarization direction of the piezoelectric body 35 (which is, the direction from the lower electrode 36 toward the upper electrode 34). As a modified example, the driving signal may instead be applied to the upper electrode 34 of the actuator 3, such that the voltage application direction does not match with the polarization direction of the piezoelectric body 35. In this case, as illustrated in FIG. 13, a driving waveform 301 (which corresponds to the driving waveform 300 being vertically inverted) would be applied. The same modification applies to the multi-drop waveforms.

In a modification of the above-described inkjet heads 100 to 103, both the actuator 3 and the nozzle 24 may not be disposed on the surface of the nozzle plate 2. The inkjet head utilizing the above-described driving waveforms may include an actuator for any driving scheme or type, for example, a drop on-demand piezoelectric scheme, a shared-wall type, and a shear-mode type actuator.

According to the above-described embodiments, it is possible to provide inkjet heads capable of suppressing misting when ink is ejected.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inkjet head, comprising:

a nozzle;

an ink pressure chamber connected to the nozzle;

an actuator configured to change a volume of the ink pressure chamber for ejecting ink from the nozzle; and an actuator driving circuit configured to supply a driving waveform to the actuator, the driving waveform including an ejection pulse portion that changes from a first voltage to a second voltage that causes the ink pressure chamber to expand and then from the to a third voltage that causes the ink pressure chamber to contract to eject ink from the nozzle, the third voltage being at a potential between a potential of the first voltage and a potential of the second voltages, a difference between the potentials of the second and third voltages being greater than a difference between the potentials of the third and first voltages, wherein the driving waveform includes, after the ejection pulse portion, a cancellation pulse portion that changes from the third voltage to a fourth voltage that causes the ink pressure chamber to contract and then changes from the fourth voltage to a fifth voltage that causes the ink pressure chamber to expand, and the third voltage and the fifth voltage are the same voltage level.

2. The inkjet head according to claim 1, wherein the cancellation pulse portion directly follows the ejection pulse portion in the driving waveform, and the ejection pulse portion and the cancellation pulse portion together form a Draw-Draw-Release-Draw driving waveform.

3. The inkjet head according to claim 1, wherein the driving waveform further includes, after the cancellation pulse portion, a sixth voltage that causes the ink pressure chamber to return to the same state as at application of the first voltage.

4. The inkjet head according to claim 1, wherein the driving waveform is a multi-drop driving waveform for ejecting droplets of ink more than once from the nozzle.

5. The inkjet head according to claim 1, wherein a ratio of the potential difference between the second and third voltages to the potential difference between the third and first voltages is in a range of 6:4 to 8:2.

6. The inkjet head according to claim 5, wherein the ratio is 7:3.

7. The inkjet head according to claim 1, wherein the first voltage is a positive voltage.

8. The inkjet head according to claim 1, wherein the actuator comprises a piezoelectric body.

9. An inkjet head, comprising:

an actuator configured to change a volume of an ink pressure chamber; and an actuator driving circuit configured to apply a driving waveform to the actuator, the driving waveform including:

an ejection pulse portion that changes from a first voltage to a second voltage at which the ink pressure chamber expands and then from the second voltage to a third voltage at which the ink pressure chamber contracts to eject ink from the inkjet pressure chamber through a nozzle, the third voltage being between the first voltage and the second voltage in potential level, a difference in potential between the second and third voltages being greater than a difference in potential between the third and first voltages; and a cancellation pulse portion that changes from the third voltage to a fourth voltage at which the ink pressure chamber contracts and then changes from the fourth voltage to a fifth voltage at which the ink pressure chamber expands again, the fifth voltage being equal to the third voltage in potential.

10. The inkjet head according to claim 9, wherein the driving waveform further includes, after the cancellation pulse portion, a sixth voltage that causes the ink pressure chamber contracts to return to the same state as at the application of the first voltage.

11. The inkjet head according to claim 9, wherein the driving waveform is a multi-drop driving waveform for ejecting droplets of ink more than once from the nozzle.

12. The inkjet head according to claim 9, wherein a ratio of the potential difference between the second and third voltages to the potential difference between the third and first voltages is in a range of 6:4 to 8:2.

13. An inkjet printer, comprising:

an ink tank configured to hold ink; and an inkjet head configured to receive ink from the ink tank, the inkjet head comprising:

a nozzle;

an ink pressure chamber connected to the nozzle;

an actuator configured to change a volume of the ink pressure chamber for ejecting ink from the nozzle; and an actuator driving circuit configured to supply a driving waveform to the actuator, the driving waveform including an ejection pulse portion that changes from a first voltage to a second voltage that causes the ink pressure chamber to expand and then from the to a third voltage that causes the ink pressure chamber to contract to eject ink from the nozzle, the third voltage being at a potential between a potential of the first voltage and a potential of the second voltages, a difference between the potentials of the second and third voltages being greater than a difference between the potentials of the third and first voltages, wherein the driving waveform includes, after the ejection pulse portion, a cancellation pulse portion that changes from the third voltage to a fourth voltage that causes the ink pressure chamber to contract and then changes from the fourth voltage to a fifth voltage that causes the ink pressure chamber to expand, and the third voltage and the fifth voltage are the same voltage level.

14. The inkjet printer according to claim 13, wherein the driving waveform is a multi-drop driving waveform for ejecting droplets of ink more than once from the nozzle.

15. The inkjet printer according to claim 13, wherein a ratio of the potential difference between the second and third voltages to the potential difference between the third and first voltages is in a range of 6:4 to 8:2.

16. The inkjet printer according to claim 15, wherein the actuator comprises a piezoelectric body.

* * * * *